United States Patent [19]
DiGiovanni

[11] Patent Number: 5,894,676
[45] Date of Patent: *Apr. 20, 1999

[54] BRICK LAYING TEMPLATE

[76] Inventor: Robert DiGiovanni, 49 Beach Ave., Staten Island, N.Y. 10306

[*] Notice: This patent is subject to a terminal disclaimer.

[21] Appl. No.: 08/831,915

[22] Filed: Apr. 2, 1997

[51] Int. Cl.$^6$ .............................. G01B 5/16; E04G 21/18
[52] U.S. Cl. .......................... 33/518; 33/645; 52/749.13
[58] Field of Search .......................... 33/518, 526, 527, 33/613, 645, 562; 52/749.13, 749.15, 648.1, 653.1, 677, 684, 687, 509, 506.05, 512

[56] References Cited

U.S. PATENT DOCUMENTS

| | | | |
|---|---|---|---|
| 2,130,743 | 9/1938 | Parsons | 33/518 |
| 2,852,932 | 9/1958 | Cable | 33/526 |
| 5,459,938 | 10/1995 | Knight et al. | 33/518 |

FOREIGN PATENT DOCUMENTS

| | | | |
|---|---|---|---|
| 16147 | 12/1955 | Germany | 33/518 |

Primary Examiner—Christopher W. Fulton

[57] ABSTRACT

A template for laying a plurality of bricks including a substantially planar and rigid sheet having a plurality of support pins projecting therefrom at a 90° angle in a predetermined pattern for supporting a plurality of bricks. This pattern includes a first plurality of support pins being disposed along a first horizontal line at predetermined spaces corresponding to the length of a brick, and a second plurality of support pins being disposed along a second horizontal line at predetermined spaces corresponding to the length of a brick. The first horizontal line of support pins is parallel to the second horizontal line of support pins, and the first horizontal line is spaced from the second horizontal line by more than the height of a brick. In addition, the support pins in the first horizontal line are offset from the support pins in the second horizontal line. The template also includes a first plurality of holes formed in the sheet for receiving nails, screws or rivets for attaching the sheet to a fixed surface; and a second plurality of holes formed in the sheet for receiving an L-shaped wall tie for attaching the sheet to the bricks being layed.

70 Claims, 11 Drawing Sheets

BRICK LAYING TEMPLATE

FIELD OF THE INVENTION

This invention relates to an improved brick laying template for use in the construction of a brick wall for a building. More particularly, this template is a guide for brick laying which facilitates the uniform arrangement and spacing of a plurality of bricks during the construction of an inner or outer wall for a building.

BACKGROUND OF THE INVENTION

The use of brick work forms, brick laying molds, guide brackets for brick laying, brick laying guides and brick laying templates are well known in the construction industry for preparing walls, patios, walkways, roadways, fireplaces and the like using conventional bricks as the principle construction material. The aforementioned brick laying forms are used by both professional brick layers and amateur brick layers (homeowners and other do-it yourself enthusiasts) in these types of construction projects (walls, patios, walkways, etc.) to produce a final product having a consistently correct pattern, an even brickwork spacing and a good overall appearance to the final product (professional looking appearance at a nominal cost).

The major drawback in using these brick laying forms and guides for conventional brick construction for exterior and interior walls is that it is still labor intensive, material intensive and is usually done by a professional brick layer or mason. Setting up these forms in order to be used properly, in most cases, is as time consuming as if the professional brick layer had started laying the bricks in a conventional manner, with no real saving in labor time.

There remains a need for an improved brick laying template that provides an easy "fool proof" method of set-up and ease of use in which a non-professional user can provide a professional looking final product at a greatly reduced labor factor. In addition, the brick laying template should also provide insulation and a water barrier protection to the wall being constructed.

DESCRIPTION OF THE PRIOR ART

Brickwork forms, brick laying molds, guide brackets for brick laying, brick laying guides and brick laying templates having various designs, structures, configurations and materials of construction have been disclosed in the prior art. For example, U.S. Pat. No. 4,026,083 to Hoyt et al discloses a modular brickwork form for enabling an unskilled individual in brick laying techniques to install professional quality looking patios, walkways, walls and the like. The brickwork forms include tray-like modules, containing a network of grids which create brick-shaped voids arranged in commonly used brick patterns. This prior art patent does not disclose the particular structure of the brick laying template of the present invention.

U.S. Pat. No. 4,031,682 to Renkert discloses a method of making a building panel. The panel is made by the steps which include laying a brick mold form horizontally, laying bricks in the pattern indicated in the brick mold form and depositing a fibrous and cementitious mixture in the spaces between the bricks and over the tops of the bricks. This prior art patent does not disclose the particular structure, design or method used in the brick laying template of the present invention.

U.S. Pat. No. 4,631,833 to Moye discloses a guide bracket for brick laying. The guide bracket facilitates the construction of a brick corner and includes at least one guide bracket having two wall sections which intersect each other at the same angle as the sides of the corner. The guide bracket is positioned against a partially constructed brick corner so that the wall sections flatly abut against opposite sides of the corner. This prior art patent does not disclose the particular structure, design, or method used in the brick laying template of the present invention.

U.S. Pat. No. 4,809,470 to Bauer et al discloses a panel system for brick laying for facilitating the construction of a brick facade. The panel system includes a panel of polystyrene foam having a outer wall consisting of channel bars in which to secure the bricks in place by a friction fit until mortar is laid. Channel bars separate the bricks in a vertical direction. This prior art patent does not disclose the particular structure or design of the present invention.

U.S. Pat. No. 4,858,410 to Goldman discloses a modular brick work form for producing a regular pattern in brick work construction. This form includes a plurality of raised dividers and ledges to form a continuous pattern. The ledges have dimples to interconnect with adjoining modular forms without significant deformation. In addition, the forms may include ports for drainage and corrugation for added strength. This prior art patent does not disclose the particular structure or design of the brick laying template of the present invention.

U.S. Pat. No. 5,311,714 to Passeno discloses a brick panel apparatus that utilizes thin bricks such that the finished wall looks like a conventional brick surface. The use of this panel greatly reduces the costs of construction for building the wall. The brick panel construction apparatus includes a stiff backing member being laminated to a water impermeable sheet which is primarily planar in shape. A plurality of integrally formed projections are disposed in a plurality of horizontal rows on the impermeable sheet, such that the projections and the sheet form a one-piece structure. In use, a plurality of spaced apart thin bricks are adhesively attached to the sheet and the bricks are disposed between the rows of projections, where then mortar or grout is applied to the spaces between the bricks. The mortar/grout covers the rest of the sheet, including the projections. This prior art patent does not disclose the particular structure or design of the present invention nor the method for using the brick laying template of the present invention.

U.S. Pat. No. 5,459,938 to Knight et al discloses a guide for brick laying which facilitates the uniform arrangement of bricks during the construction of floors, walkways, patios and the like. The guide includes a rectangular lattice panel having square openings for temporary placement on top of a prepared work area whereby bricks are placed inside the square openings for automatically forming a desired pattern. This prior art patent does not disclose the particular structure or design of the present invention nor the method for using the brick laying template of the present invention.

None of the aforementioned prior art patents teach or disclose the structure or configuration of a brick laying template having an operational method which is simple in use for laying of bricks in a consistent pattern by a non-professional (brick layer) user, as in the present invention.

Accordingly, it is an object of the present invention to provide a brick laying template that is easy to set-up and use and in which a non-professional user can provide a professional looking brick wall, patio, walkway, fireplace, chimney and the like at a greatly reduced time and labor cost versus conventional brick laying by a professional mason.

Another object of the present invention is to provide a brick laying template that includes a plurality of support pins for bricks being arranged in a predetermined pattern, and a plurality of spacers for separating the bricks within each brick row for facilitating a consistent "fool proof" pattern while a brick wall is being constructed.

Another object of the present invention is to provide a brick laying template that eliminates typical masonry tools such as trowels, levels, rubber mallets and the like for the laying of rows of bricks during construction.

Another object of the present invention is to provide a brick laying template that eliminates conventional brick laying or masonry skills. No mason chalk lines are needed for leveling each row of bricks and no tapping of the bricks are needed for leveling, and no building leads and wall footing are needed at each end of the wall under construction, as each template has its own leveling component contained therein.

Another object of the present invention is to provide a brick laying template that also acts as an insulation and water barrier when the finished wall is constructed.

Another object of the present invention is to provide a brick laying template that can be mass produced in an automated and economical manner, is light-weight and durable and is readily affordable by the user.

SUMMARY OF THE INVENTION

In accordance with the present invention there is provided a template for laying a plurality of bricks. The template includes a substantially planar and rigid sheet having a plurality of support pins projecting therefrom at a 90° angle in a predetermined pattern for supporting a plurality of bricks. This pattern includes a first plurality of support pins being disposed along a first horizontal line at predetermined spaces corresponding to the length of a brick, and a second plurality of support pins being disposed along a second horizontal line at predetermined spaces corresponding to the length of a brick. The first horizontal line of support pins is parallel to the second horizontal line of support pins, and the first horizontal line is spaced from the second horizontal line by more than the height of a brick. In addition, the support pins in the first horizontal line are offset from the support pins in the second horizontal line.

The template also includes a first plurality of holes formed in the sheet for receiving nails, screws, or rivets for attaching the sheet to a fixed surface; and a second plurality of holes formed in the sheet for receiving an L-shaped wall tie for attaching the sheet to the bricks being layed.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED AND ALTERNATE EMBODIMENTS

OVERVIEW

The brick laying template 10 and its component parts of the preferred and alternate embodiments of the present invention are represented in detail by FIGS. 1 through 8 and 10 to 11 of the drawings. Also, a cinder block laying template 300 and its component parts of a third alternate embodiment of the present invention is represented in detail by FIG. 9 of the drawings. The brick laying template 10 of the preferred embodiment, as shown in FIGS. 1 to 4, is used for laying bricks 12 to form an exterior brick wall 16 on a building 18 and showing the template 10 in operational use by the user.

Figure 5:
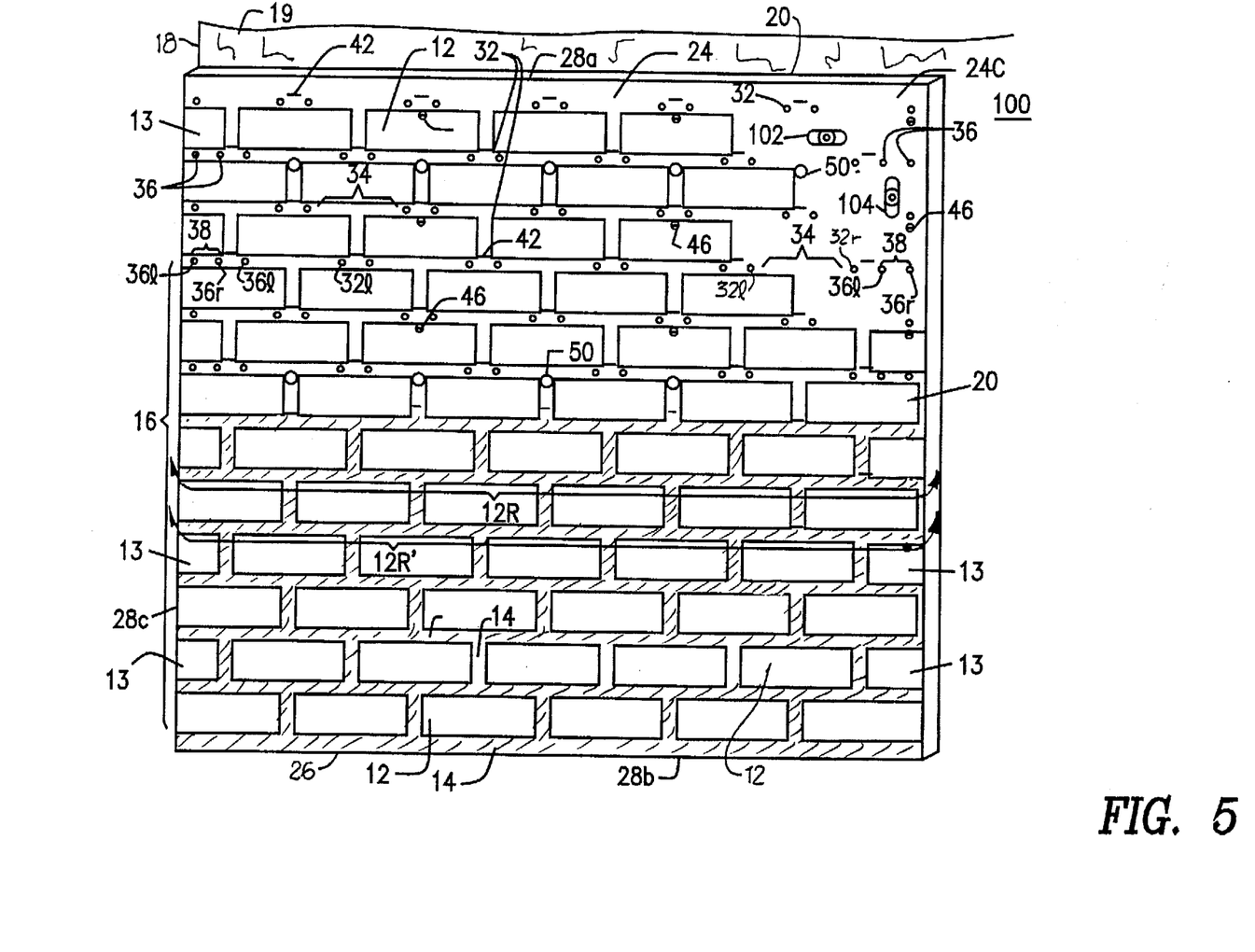
FIG. 5 is an enlarged partial front perspective view of the brick laying template of the first alternate embodiment of the present invention showing the horizontal and vertical leveling devices mounted within the planar sheet.
Figure 6:
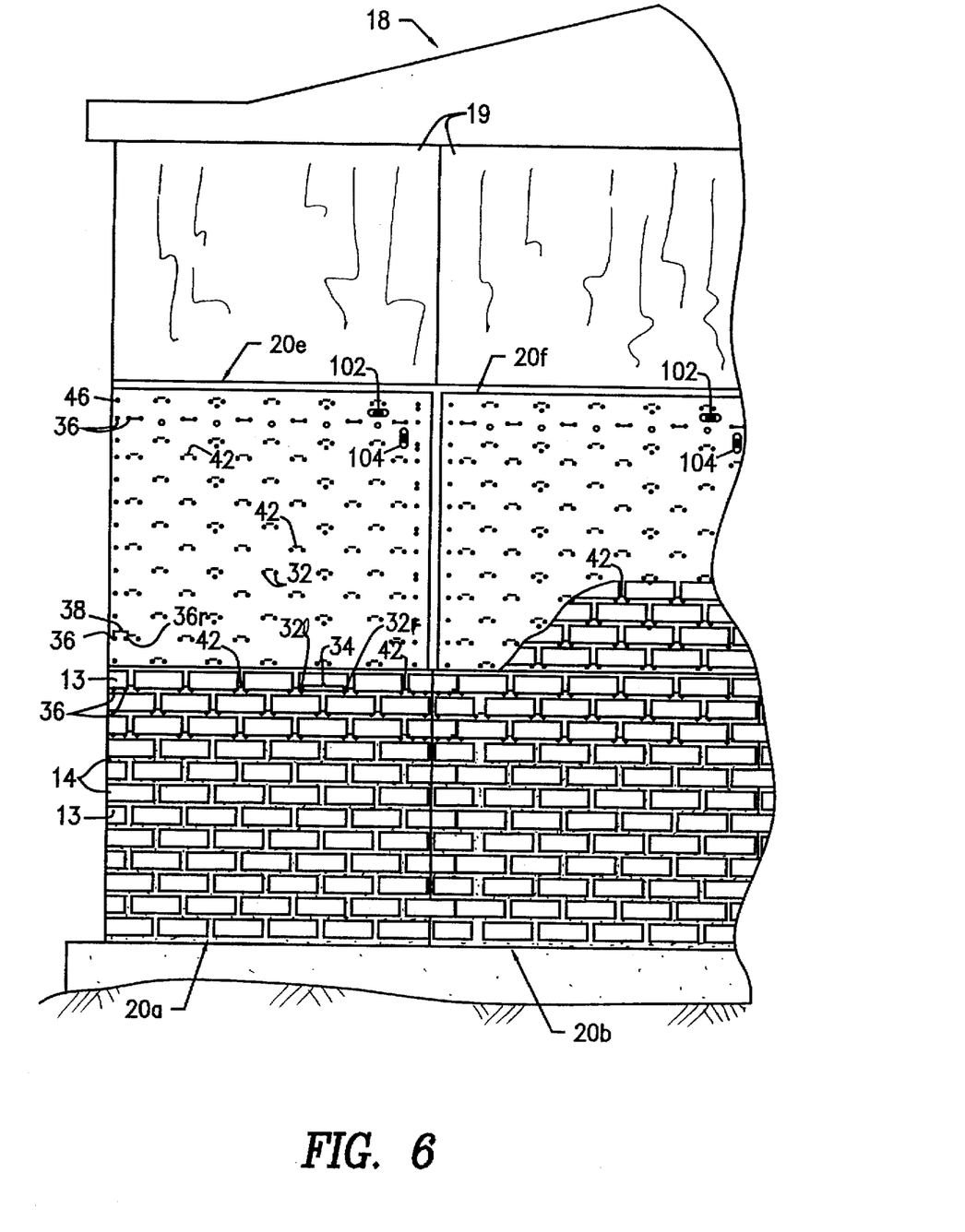
FIG. 6 is a front perspective view of the brick laying template of the first alternate embodiment of the present invention showing a plurality of templates having leveling devices therein mounted to a fixed surface of a house; and in operational use having a plurality of layered rows of bricks thereon.

The brick laying template 100 of the first alternate embodiment, as shown in FIGS. 5 and 6, is a template having horizontal and vertical leveling devices 102 and 104 contained within the planar sheet 20 for initially leveling the template to the exterior sheet of plywood wall 19 of building 18. In al other respects, the brick laying template 100 of the first alternate embodiment functions and operates in the same manner as the brick laying template 10 of the preferred embodiment.

Figure 7:
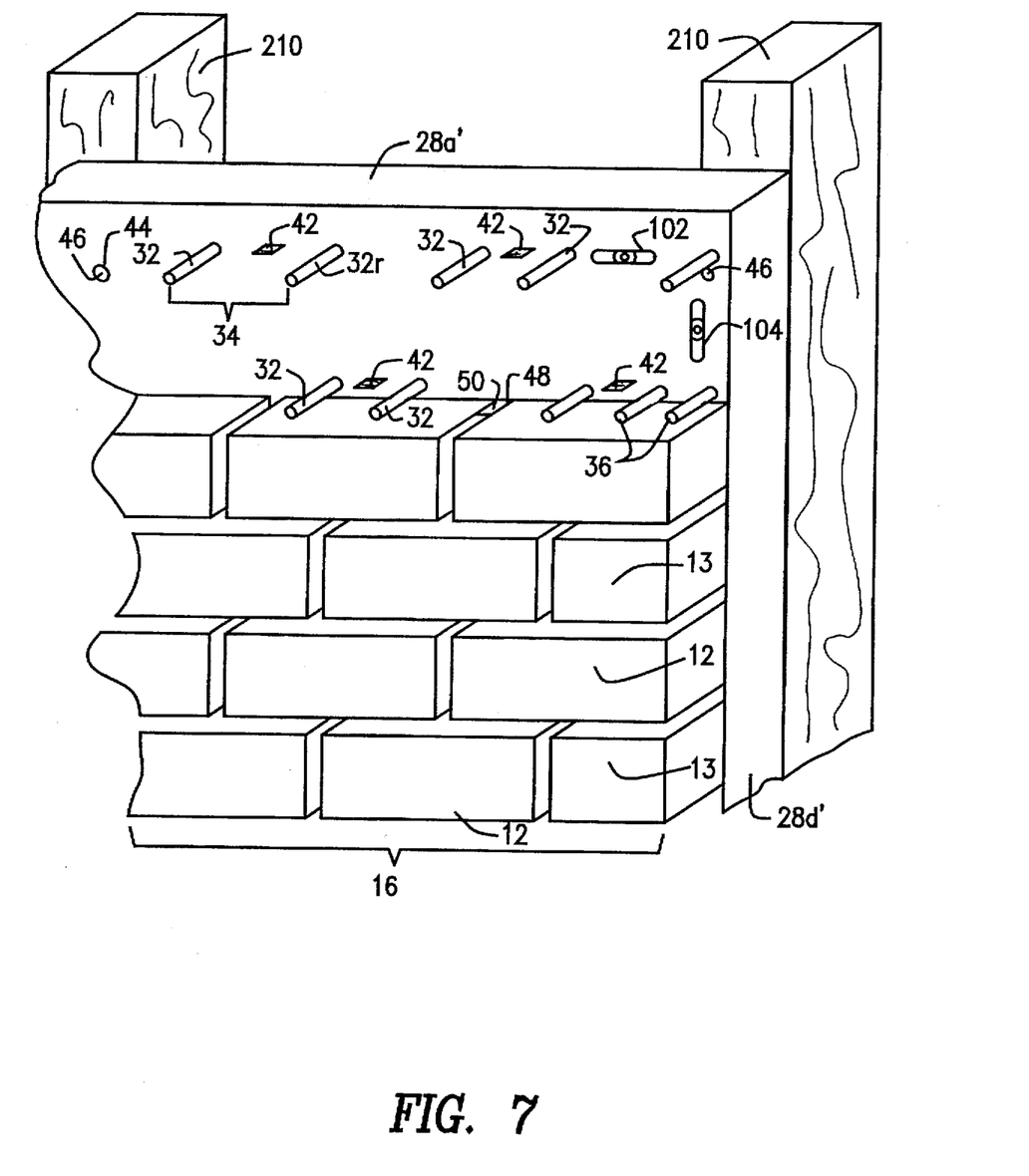
FIG. 7 is an enlarged partial front perspective view of the brick laying template of the second alternate embodiment of the present invention showing the planar sheet of a substantial thickness mounted on a plurality of 2×4 studs.
Figure 8:
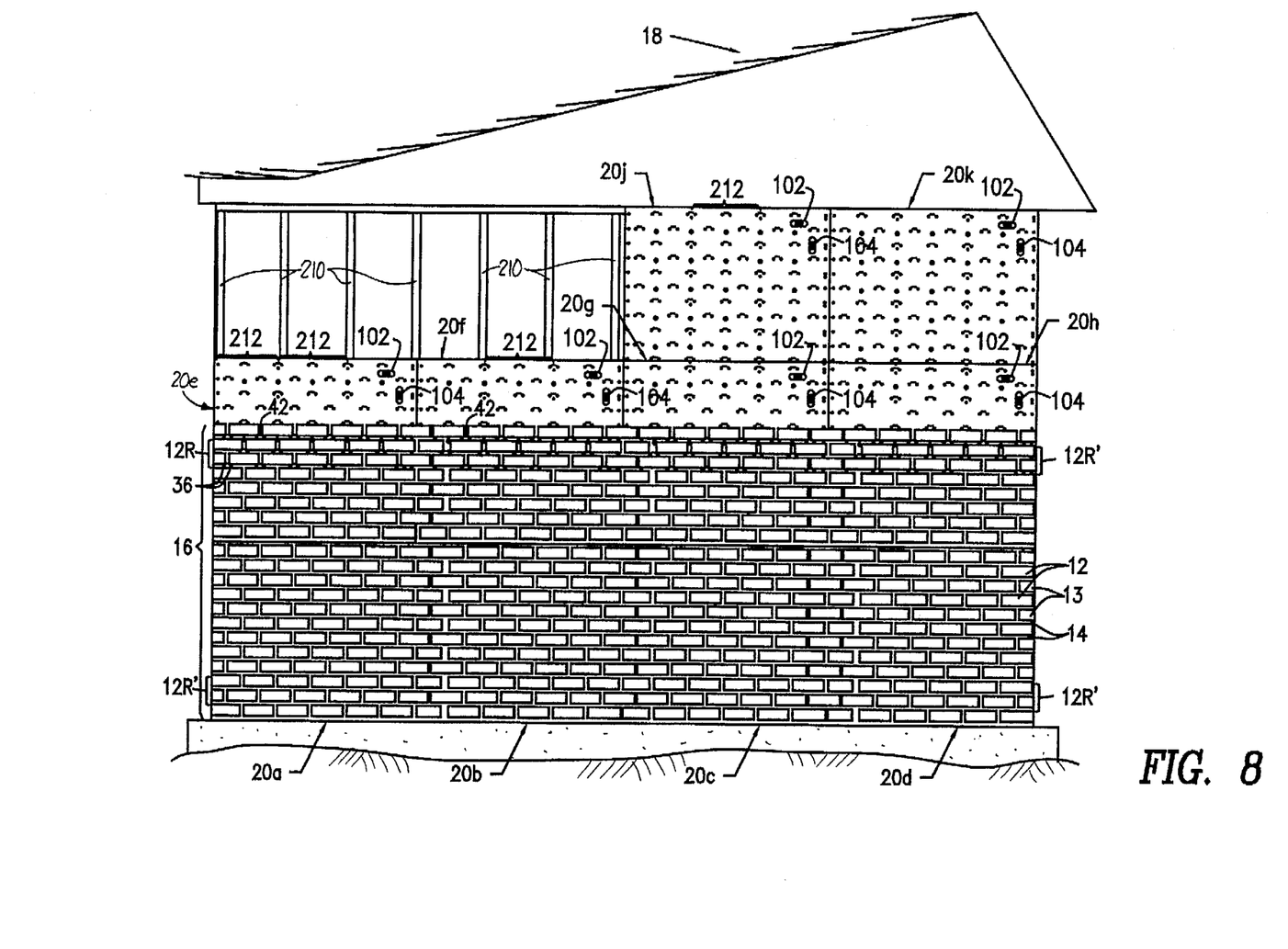
FIG. 8 is a front perspective view of the brick laying template of the second alternate embodiment of the present invention showing a plurality of templates having leveling devices therein and mounted to a plurality of 2×4 studs of a house; and in operational use having a plurality of layered rows of bricks thereon.

The brick laying template 200 of the second alternate embodiment, as shown in FIGS. 7 and 8, is a template that provides both sheathing and brick support, and may be used as a substitution for plywood sheets 19 or press board in building an exterior wall. The planar sheet 20 is thicker in dimension and has circular hole openings 244 that are sixteen inches (16") on center for attaching to the two by four (2×4) studs 210 of a building 18 by fastening means 46 in the form of screws or nails. In all other respects, the brick laying template 200 of the second alternate embodiment functions and operates in the same manner as the brick laying template 10 of the preferred embodiment. It should be noted that template 200 could also incorporate the leveling devices 102 and 104 of template 100.

Figure 9:
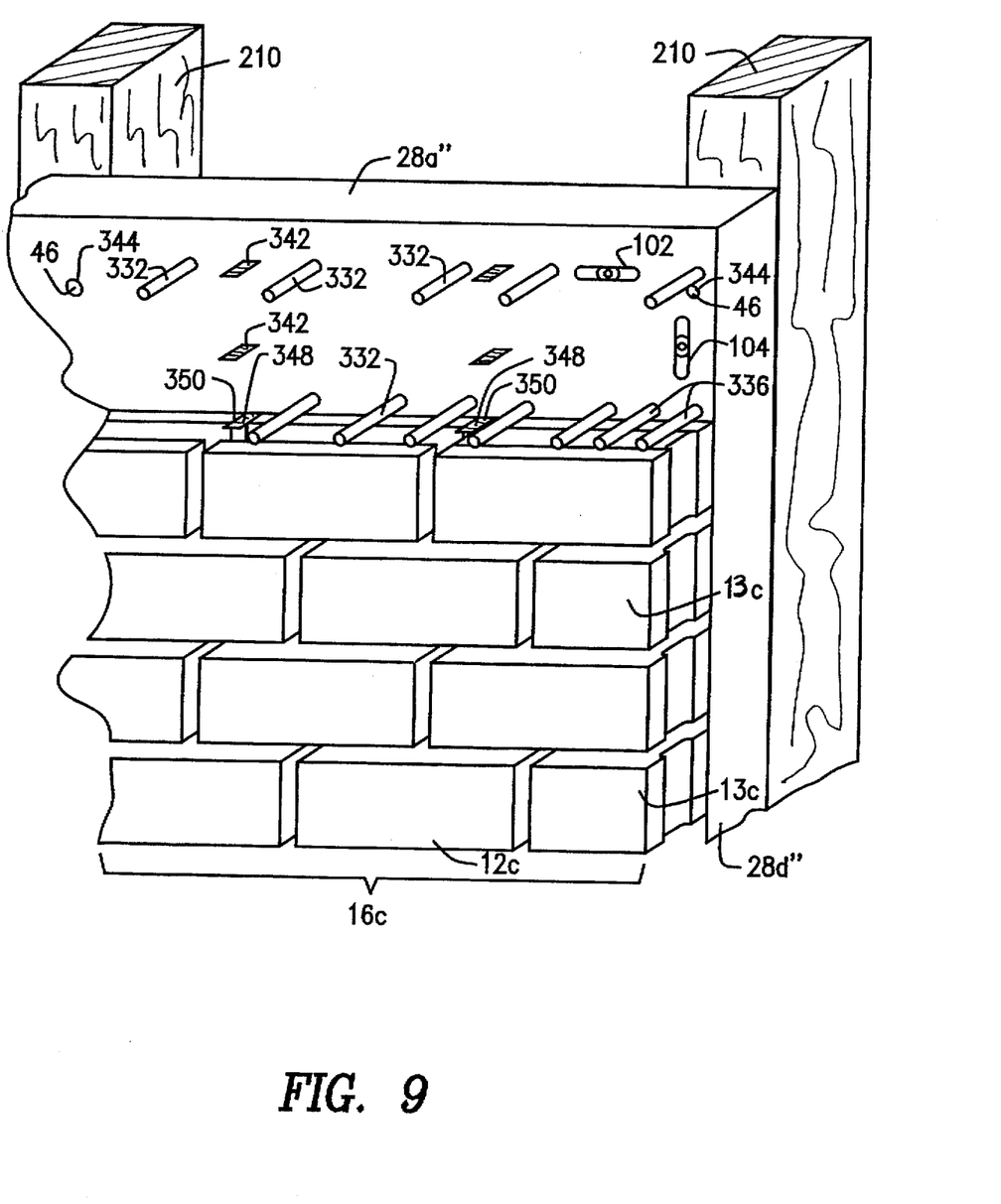
FIG. 9 is an enlarged partial front perspective view of the cinder block laying template of the third alternate embodiment of the present invention showing the planar sheet of a substantial thickness mounted on a plurality of 2×4 studs; and having longer and larger diameter support pins for holding a plurality of cinder blocks thereon.

The cinder block laying template 300 of the third alternate embodiment, as shown in FIG. 9, is a template that provides both sheathing and cinder block support, and may be used as a substitution for plywood sheets 19 or press board in building an exterior cinder block wall 16c. The support pins 332 and 336 are larger in diameter and longer in length than the support pins 32 and 36 of the preferred and alternate embodiments of templates 10, 100 and 200. In all other respects, the cinder block laying template 300 of the third alternate embodiment functions and operates in the same manner as the brick laying template 200 of the alternate embodiment. It should be noted that template 300 could also incorporate the leveling devices 102 and 104 of template 100.

Figure 10:
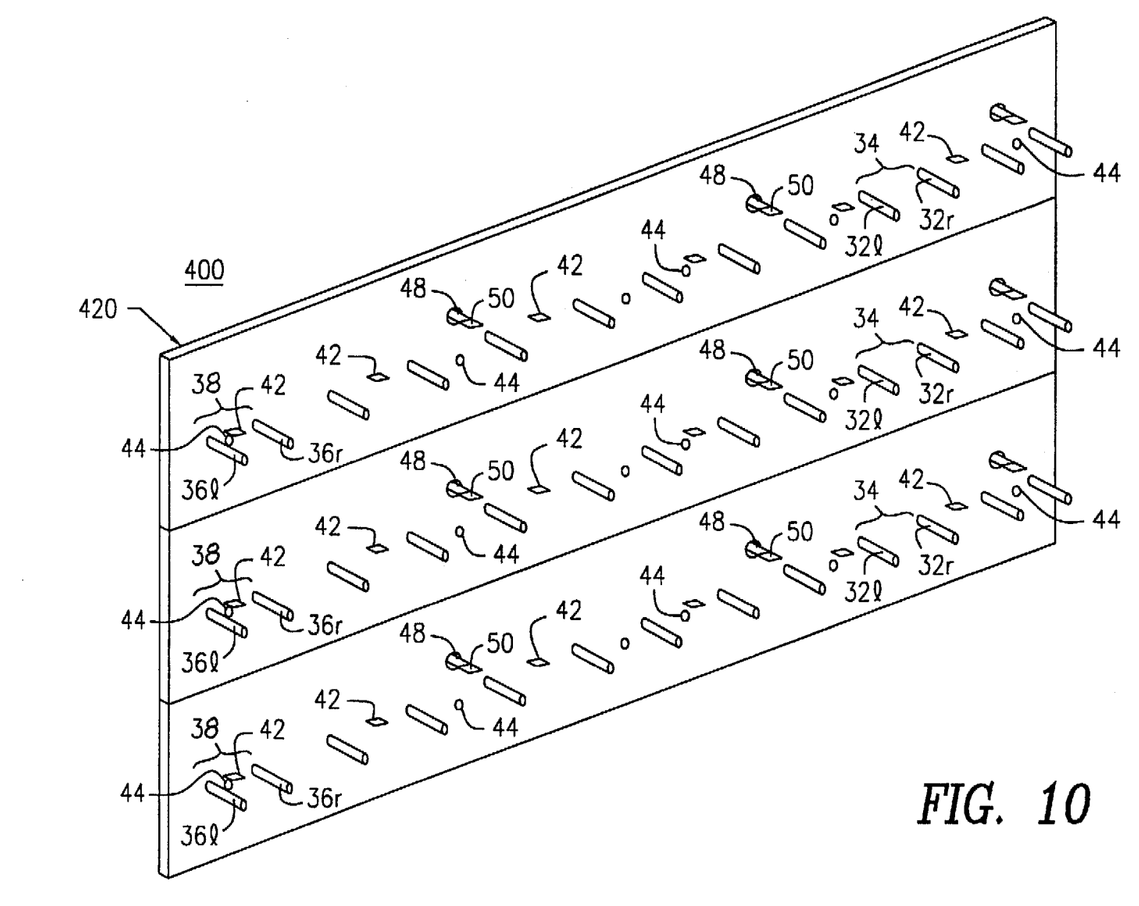
FIG. 10 is a front perspective view of the brick laying template of the fourth alternate embodiment of the present invention showing the template having a plurality of strips with each strip having only a single row of support pins, spacers and wall ties contained thereon.

The brick laying template 400 of the fourth alternate embodiment, as shown in FIG. 10, allows the user to combine two or more strips 420 to lay two or more rows of bricks at a time. In all other respects, the brick laying template 400 of the fourth alternate embodiment functions and operates in the same manner as the brick laying template 10 of the preferred embodiment. It should be noted that template 400 may also incorporate the leveling devices 102 and 104 of template 100.

Figure 11:
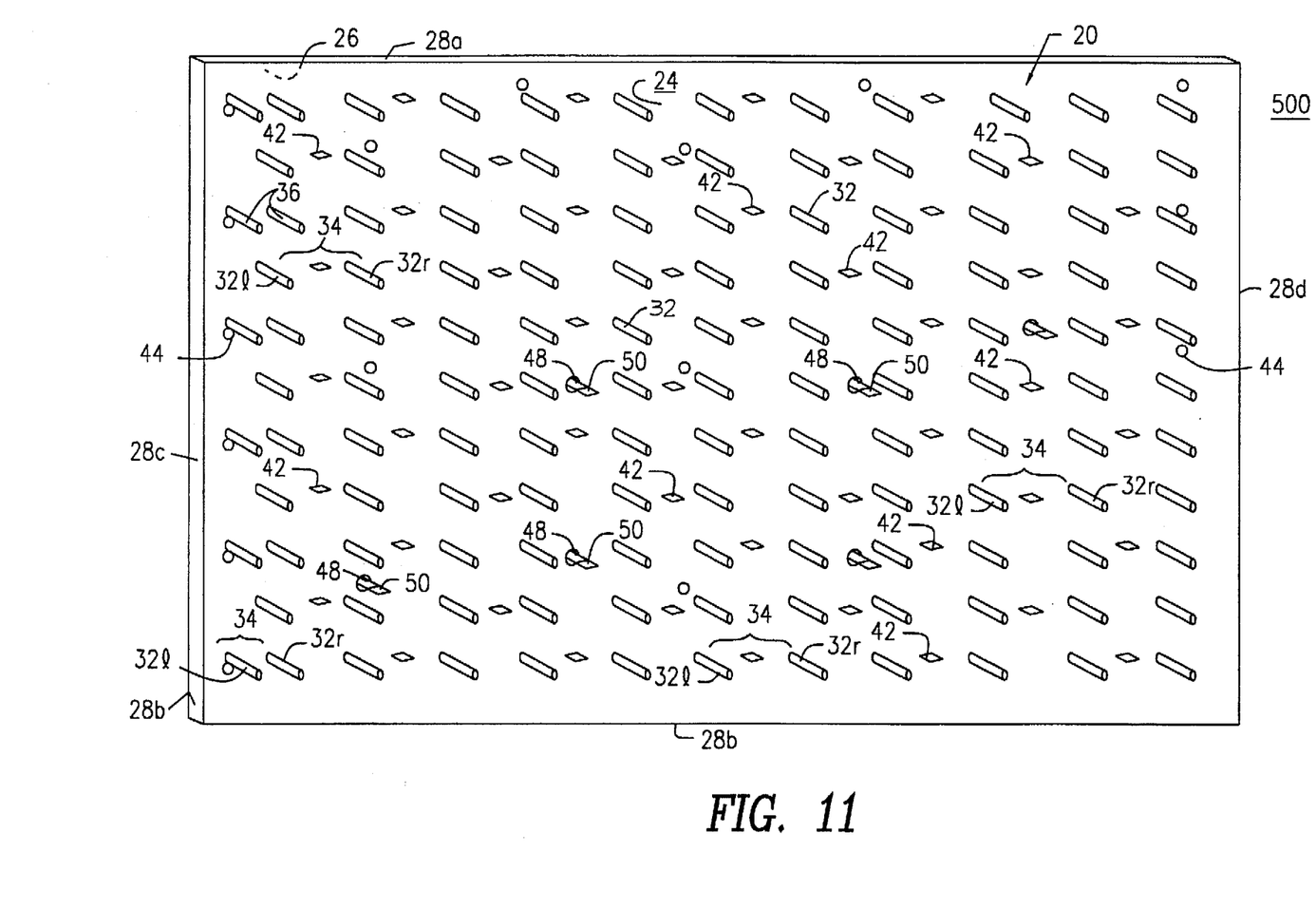
FIG. 11 is a front perspective view of the brick laying template of the fifth alternate embodiment of the present invention showing the major component parts contained thereon.

The brick laying template 500 of the fifth alternate embodiment, as shown in FIG. 11, is a template having each row of support pins in parallel with the next row of support pins contained within planar sheet 20 for supporting multiple rows of bricks 12. In all other respects, the brick laying template 500 of the fifth alternate embodiment functions and operates in the same manner as the brick laying template 10 of the preferred embodiment. It should be noted that template 500 could also incorporate the leveling devices 102 and 104 of template 100.

PREFERRED EMBODIMENT 10

Figure 1:
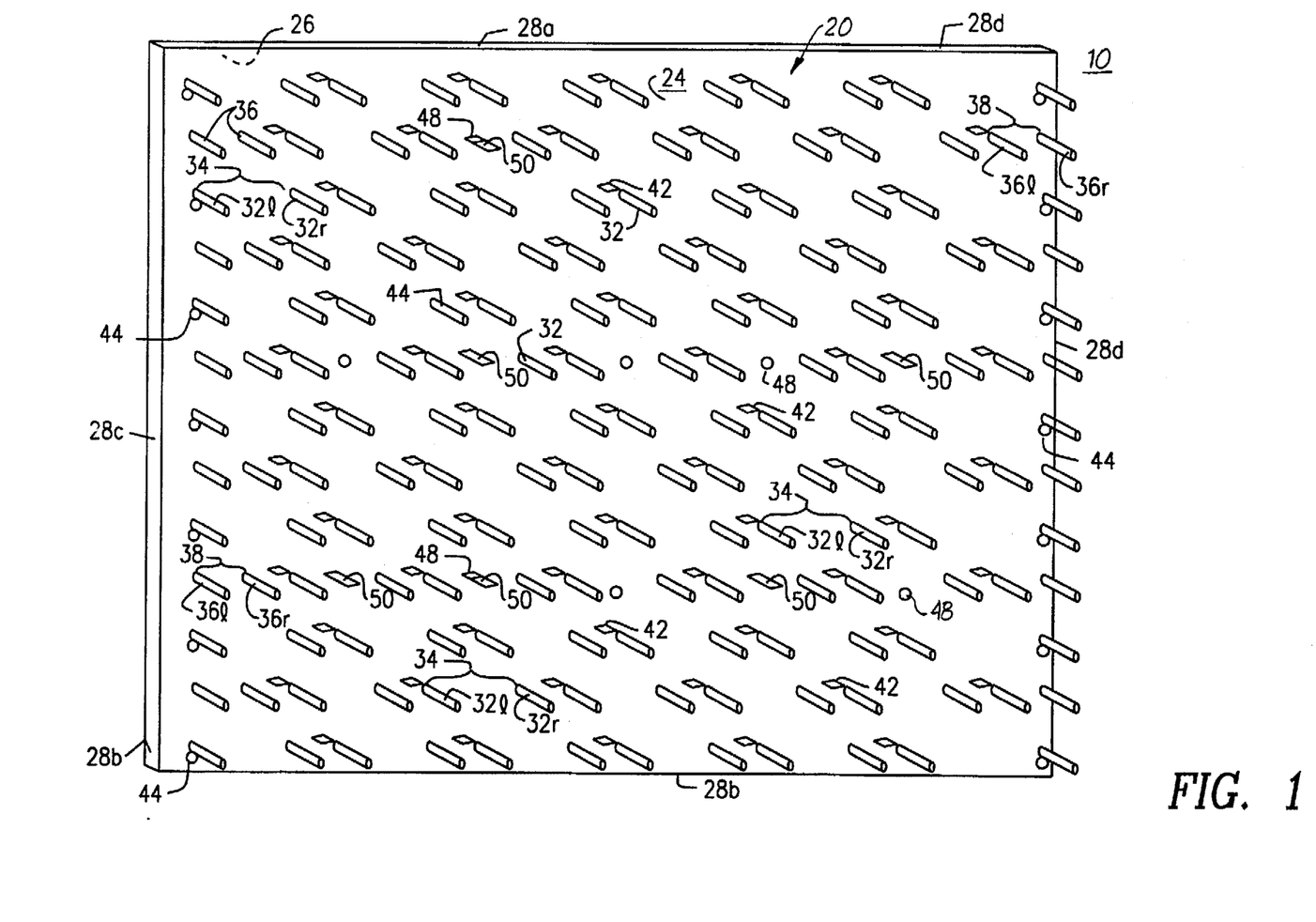
FIG. 1 is a front perspective view of the brick laying template of the preferred embodiment of the present invention showing the major component parts contained thereon.
Figure 2:
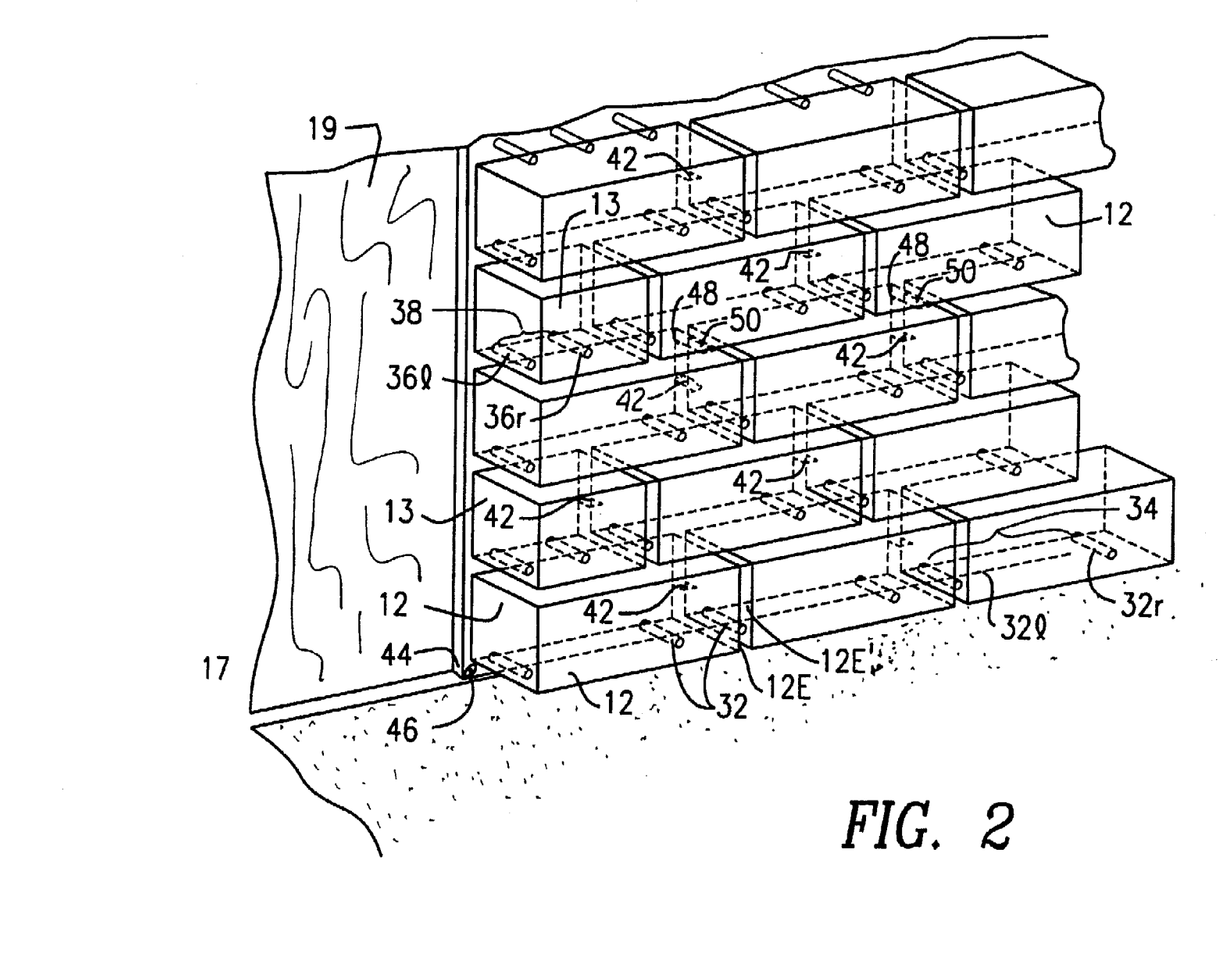
FIG. 2 is a front perspective view of the brick laying template of the present invention showing the template in operational use having a plurality of layered rows of bricks thereon.
Figure 3:
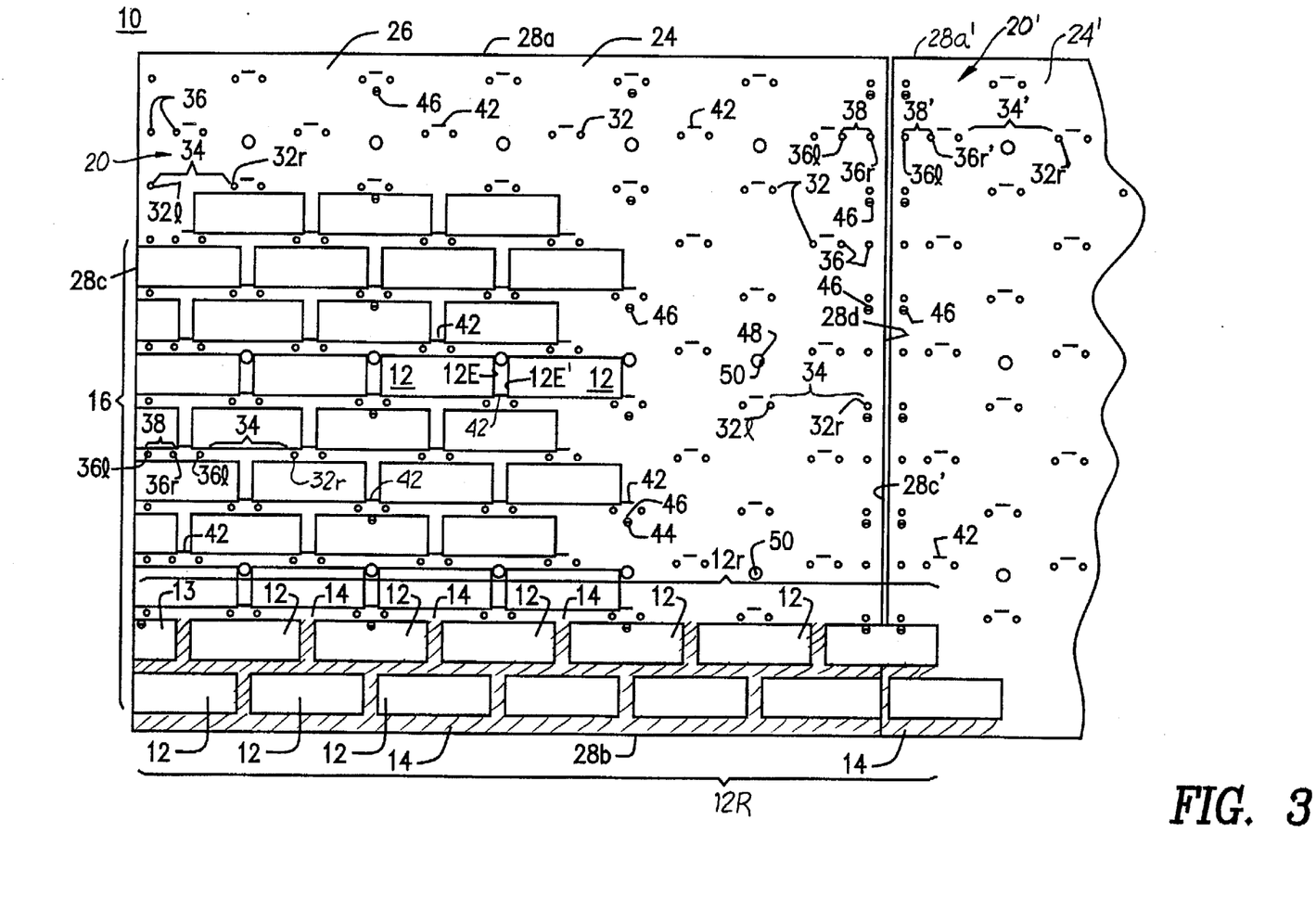
FIG. 3 is a front plan view of the brick laying template of the present invention showing the major component parts contained thereon and in operational use having a plurality of layered rows of bricks thereon.
Figure 4:
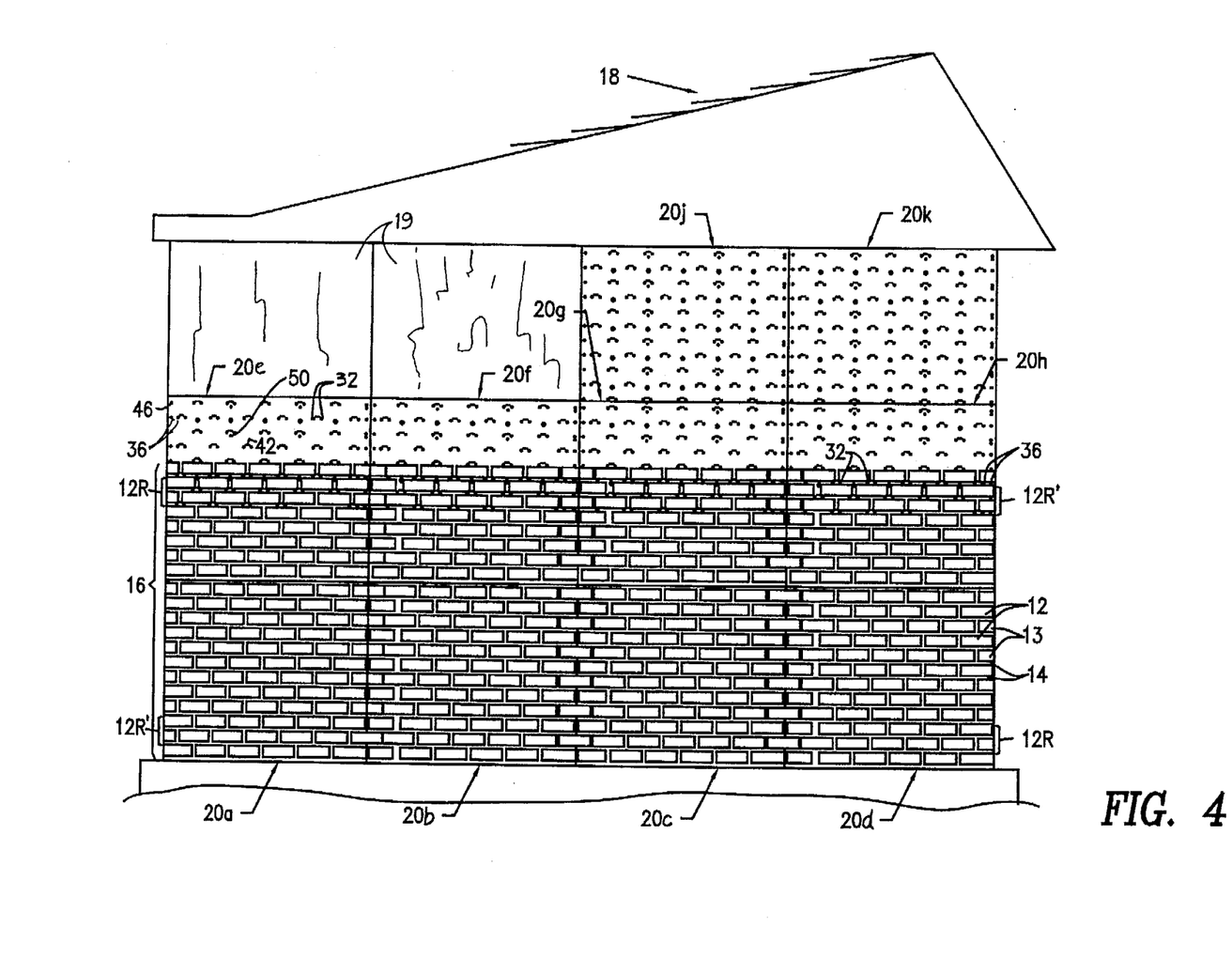
FIG. 4 is a front perspective view of the brick laying template of the present invention showing a plurality of templates mounted to a fixed surface of a building and in operational use having a plurality of layered rows of bricks thereon.

The brick laying template 10 and its component parts of the preferred embodiment of the present invention are represented in detail by FIGS. 1 through 4. The brick laying template 10 includes a planar sheet 20 made of a thin, durable plastic being substantially rectangular in shape for supporting a plurality horizontal rows of layered bricks 12R and 12R', as shown in FIG. 3. Sheet 20 includes a front surface wall 24, a rear surface wall 26, and outer perimeter edges 28a, 28b, 28c, and 28d. Sheet 20 measures thirty-five and three-quarters of an inch (35¾") in height, fifty and one-half inches (50½") in length, and one-fourth of an inch (¼) in thickness. Sheet 20 includes a plurality of first support pins 32 being at predetermined spaced lengths 34 to support the length of a brick 12 within a given row of layered bricks 12R. Sheet 20 also includes a plurality of second support pins 36 being at predetermined spaced lengths 38 to support overlapping bricks 12 (from another sheet 20' which is adjacent to sheet 20) or a half-brick 13, as shown in FIGS. 2, 3, and 4. Support pins 32 and 36 extend outwardly from the front surface wall 24 of sheet panel 20 at a 90° degree angle. Support pins 32 and 36 measure 3½" inches in depth and one-eighth of an inch (⅛) in diameter. The diameter of support pins 32 and 36 has a range of ⅛" to ¼" and the length of support pins 32 and 36 has a range of 2¾ inches to 3¾ inches. Spaced length 34 is defined as the distance between a pair of support pins 32l and 32r; and spaced length 38 is defined as the distance between a pair of support pins 36l and 36r. Spaced length 34 measures approximately six and one-quarter of an inch (6¼") in length between support pins 32l and 32r; and spaced length 38 measures approximately two inches (2") in length between support pins 36l and 36r, as depicted in FIG. 3 of the drawings. Support pin 36 are located adjacent to side perimeter edges 28c and 28d of sheet 20, as shown in FIG. 3 of the drawings. Each sheet 20 can hold approximately thirteen (13) rows of bricks 12R and 12R' having six (6) bricks 12 and/or 13 per row for a total of seventy-eight (78) bricks 12 or 13 per sheet 20. Support pins 32 and 36 may be formed of wood or plastic, or metal reinforced plastic, or steel, or aluminum. Planar sheet 20 may be formed of plastic, metal, wood or the like.

Planar sheet 20 also includes a plurality of spacing elements 42 for spacing one brick end 12E from another brick end 12E' within a given row of layered bricks 12R. Spacing elements 42 are disposed between each pair of brick holding support pins 32l and 32r and 32l' and 32r'; or between each pair of brick holding support pins 36l and 36r and 32l and 32r, as depicted in FIG. 3 of the drawings. Spacing elements 42 are substantially rectangular in shape and extend outwardly from the front surface wall 24 of sheet panel 20 at a 90° degree angle. Spacing elements 42 measure one-quarter of an inch (¼") or one-half of an inch (½") in width; two inches (2") in depth and one-sixteenth of an inch (1/16") in thickness.

Planar sheet 20 further includes a first plurality of circular hole openings 44 formed within the front surface wall 24 for receiving a first fastening means 46 in the form of screws or nails for attaching the sheet 20 to a fixed surface, such as to an exterior plywood sheet 19 of building 18, as shown in FIG. 4 of the drawings. Circular hole openings 44 measure one-eighth of an inch (⅛") in diameter. A majority of hole openings 44 are located along the perimeter edges 28a to 28d of sheet 20.

In addition, sheet 20 includes a second plurality of circular hole openings 48 formed within the front surface wall 24 for receiving a second fastening means 50 (a wall tie) in the form of a L-shaped plastic or metal strap 52 for attaching the sheet 20 to the bricks 12. Plastic strap 52 prevents the bricks 12 from falling forward and away from sheet 20. Additionally, sheet panel 20 acts as an insulation and water impermeable barrier when the brick wall 16 is completed, as shown in FIG. 4 of the drawings.

FIRST ALTERNATE EMBODIMENT 100

Brick laying template 100 of the first alternate embodiment of the present invention is depicted in detail by FIGS. 5 and 6 of the drawings. All aspects of the brick laying template 100 of the first alternate embodiment are the same as the bricking laying template 10 of the preferred embodiment, except for the addition of horizontal and vertical leveling devices 102 and 104 used for leveling the template 100 to the exterior sheet of plywood wall 19 of building 18. Leveling devices 102 and 104 are positioned within the front surface wall 24 of planar sheet 20 and are located in the upper right corner 24c of planar sheet 20 adjacent to perimeter edges 28a and 28d. In all other respects, template 100 of the first alternate embodiment functions and operates in use in the same manner as the brick laying template 10 of the preferred embodiment.

SECOND ALTERNATE EMBODIMENT 200

Brick laying template 200 of the second alternate embodiment of the present invention is depicted in detail by FIGS. 7 and 8 of the drawings. All aspects of the brick laying template 200 of the second alternate embodiment are the same as the brick laying template 10 of the preferred embodiment, except for the sheet panel 20 being thicker in dimension and circular hole openings 244 being 16 inches on center for attaching to a plurality of 2×4 studs 210 of a building 18 by screws or nails. This template 200 provides both sheathing and brick support, as template 200 acts as a replacement for the plywood sheets or press board 19 in building of an exterior wall. In addition, template 200 also acts as an insulation sheet and a water protection barrier to the completed brick wall 16. The thickness dimension of planar sheet 20 may vary between ½" to 4" in depth depending upon the building code statute and functionality of the brick wall being built (e.g. fireplace, interior brick wall, etc.). In all other respects, template 200 of the second alternate embodiment functions and operates in use in the same manner as the brick laying template 10 of the preferred embodiment.

THIRD ALTERNATE EMBODIMENT 300

Cinder block laying template 300 of the third alternate embodiment of the present invention is depicted in detail by FIG. 9 of the drawings. All aspects of the cinder block laying template 300 of the third alternate embodiment are the same as the brick laying template 10 of the preferred embodiment, except for the sheet panel 20 being thicker in dimension and circular hole openings 244 being 16 inches on center for attaching to a plurality of 2×4 studs 210 of a building 18 by screws or nails. In addition, support pins 332 and 336 are larger in diameter and longer in length than the support pins 32 and 36 of the preferred embodiment of template 10. For example, support pins 332 and 336 may have a diameter of ¼" and a length of 3½ to 7½ inches. The support pins 332 and 336 in this third embodiment may be made of rigid plastic or plastic reinforced with metal. Also, there may be as many as two (2) to six (6) support pins 332 and 336 for the support of each cinder block 12C or 13C used, depending upon the support pin's diameter and length. Two or more spacers 342 maybe used in view of the height of the cinder block 12C or 13C being used. Template 300 provides both sheathing and cinder block support, as template 300 may be used as a substitution for the plywood sheets or press board 19 in building of an exterior wall. In addition, template 300 also acts as an insulation sheet and a water protection barrier to the completed cinder block wall 16C. The thickness dimension of planar sheet 20 may vary between ½ to 4" in depth depending upon the building code statute and functionality of the cinder block wall being built (e.g. fireplace, exterior cinder block wall, etc.). In all other respects, template 300 of the third alternate embodiment functions and operates in use in the same manner as the brick laying template 10 of the preferred embodiment.

FOURTH ALTERNATE EMBODIMENT 400

Brick laying template 400 of the fourth embodiment of the present invention is depicted in detail by FIG. 10 of the drawings, and is made up of a 2 or more strips 420. All aspects of the brick laying template 400 of the fourth alternate embodiment are the same as the brick laying template 10 of the preferred embodiment, except for the reduction in height of planar sheet 20 to individual planar strips 420 each having only one row of a plurality of support pins 36l and 36r and support pins 32l and 32r; spacing elements 42, wall ties 52 and openings 44 for screws 46. Each planar strip 420 has a range of one (1") to two (2") inches in height and preferably is two inches (2") in height; has a range of 48 to 60 inches in length and preferably is fifty and one-half inches (50½") in length; and has a range of one-fourth of an inch (¼") to one-half inch (½") in thickness and preferably is one-fourth of an inch (¼") in thickness. Planar strip 420 may be made of flexible or rigid plastic, metal or wood. Multiple planar strips 420 are aligned with each other to form brick laying template 400, as depicted in FIG. 10. In all other respects, template 400 of the fourth embodiment functions and operates in use in the same manner as the brick laying template 10 of the preferred embodiment.

FIFTH ALTERNATE EMBODIMENT 500

Brick laying template 500 of the fifth embodiment of the present invention is depicted in detail by FIG. 11 of the drawings. All aspects of the brick laying template 500 of the fifth alternate embodiment are the same as the brick laying template 10 of the preferred embodiment, except for the location and positioning of support pins 32l, 32r, 36f, and 36r on template 10. In template 500, each row of support pins 36l and 36r and support pins 32l and 32r are arranged in parallel in both a horizontal and vertical direction. Thus, the next row of support pins 36l' and 36r' and support pins 32l' and 32r', are vertically and horizontally parallel to all the other rows. In all other respects, template 500 of the fifth alternate embodiment functions and operates in use in the same manner as the brick laying template 10 of the preferred embodiment.

OPERATION OF THE PRESENT INVENTION

In operation, the user starts the brick laying process by initially laying a single horizontal and level chalk line 17 along the base of the exterior plywood wall 19 of building 18, as depicted in FIG. 4 of the drawings. This chalk line 17 enables the user to place the first planar sheet 20 of brick laying template 10 at the corner edge 19E of plywood wall 19 and along chalk line 17, thereby having the first planar sheet 20a leveled in both the vertical and horizontal directions. The bottom most row of sheets 20b, 20c, and 20d are also aligned along chalk line 17 for horizontal leveling; and abut each adjacent vertical edge 28d and 28c of each panel 20 for vertical leveling. The user can then proceed with the placement of additional rows of sheets 20e to 20j for subsequent rows until the plywood sheet wall 19 of building 18 has been fully covered by sheets 20a to 20j. Each sheet 20 is affixed to a portion of the plywood wall 19 by screws, rivets, or nails through the plurality of circular openings 44 formed within the front surface wall 24 of sheet 20.

The user is now ready to position the plurality of bricks 12 on each of the planar sheets 20a to 20j, as depicted in FIG. 4 of the drawings. Each full sized brick 12 is placed on a pair of adjacent support pins 32l and 32r, such that each brick end 12E is in contact with a spacing element 42, as shown in FIG. 3 of the drawings. When using a half brick 13 or when brick 12 overlaps onto another panel 20b, the user places a half brick on a pair of support pins 36l and 36r; or places the full size brick 12 on two pairs of support pins 36l, 36r, 36l' and 36r', where support pins 36l and 36r are on sheet 20a and support pins 36l' and 36r' are on sheet 20b. When the plurality of bricks 12 and 13 are positioned correctly on the plurality of support pins 32 and 36 on the multiple templates 10, the user can apply mortar, grout or cement 14 to the brickwork spaces/grooves 30 formed in the brickwork pattern 12R and 12R'. The L-shaped plastic straps 52 (wall ties) are placed in openings 48 and are embedded in the cement 14 preventing the bricks 12 and 13 of brick wall 16 from falling forward and away from the plurality of sheets 20a to 20m.

The brick laying template 100 of the first alternate embodiment functions and operates in the same manner as the brick laying template 10 of the preferred embodiment except for the initial step of leveling the first planar sheet 20a'. The built-in leveling devices 102 and 104 are used for initially leveling the panel 20a' of template 100 to the exterior sheet of plywood wall 19, as shown in FIG. 6 of the drawings. This step eliminates the need for using a single horizontal and level chalk line 17 along the base of the exterior plywood wall 19, as shown in FIG. 4 of the drawings. In this manner, the planar sheets eliminate the need for plywood and also serve as the brick laying template. The remaining steps of the operation proceed as previously mentioned for the preferred embodiment.

As shown in FIG. 8, the brick laying template 200 of the second alternate embodiment functions and operates in the same manner as the brick laying template 10 of the preferred embodiment, except for the step of attaching of the planar sheets 20a" to 20j" to a plurality of 2×4 studs 210 by nails, rivets, or screws 46 via hole openings 244, instead of attaching sheets 20 to the plywood wall 19. The remaining steps of the operation proceed as previously mentioned for the preferred embodiment.

As shown in FIG. 10, the brick laying template 400 of the fourth alternate embodiment functions and operates in the same manner as the brick laying template 10 of the preferred embodiment, except for the initial steps of aligning the multiple planar strips 420 with each other in a horizontal fashion, and affixing the plurality of planar strips 420 to a fixed surface in order to form brick laying template 400. By aligning the plurality of strips 420, the horizontal row of support pins on each strip are parallel with respect to each other, as in template 10.

ADVANTAGES OF THE PRESENT INVENTION

Accordingly, an advantage of the present invention is that it provides for a brick laying template that is easy to set-up and use and in which a non-professional user can provide a professional looking brick wall, patio, walkway, fireplace, chimney and the like at a greatly reduced time and labor cost versus conventional brick laying by a professional mason.

Another advantage of the present invention is that it provides for a brick laying template that includes a plurality of support pins for bricks being arranged in a predetermined pattern, and a plurality of spacers for separating the bricks within each brick row for facilitating a consistent "fool proof" pattern while a brick wall is being constructed.

Another advantage of the present invention is that it provides for a brick laying template that eliminates typical masonry tools such as trowels, levels, rubber mallets and the like for the laying of rows of bricks during construction.

Another advantage of the present invention is that it provides for a brick laying template that eliminates conventional brick laying or masonry skills. No mason chalk lines are needed for leveling each row of bricks and no tapping of the bricks are needed for leveling, and no building leads and wall footing are needed at each end of the wall under construction, as each template has its own leveling component contained therein.

Another advantage of the present invention is that it provides for a brick laying template that also acts as an insulation and water barrier when the finished wall is constructed.

Another advantage of the present invention is that it provides for a brick laying template that can be mass produced in an automated and economical manner, is lightweight and durable and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

I claim:

1. A template for laying a plurality of bricks, comprising:
   a) a substantially planar sheet having a plurality of support pins projecting therefrom at a 90° angle for supporting a plurality of bricks;
   b) said plurality of support pins being arranged in a predetermined pattern, said pattern including a first plurality of said support pins disposed along a first horizontal line at predetermined spaces corresponding to the length of a brick, a second plurality of said support pins disposed along a second horizontal line at predetermined spaces corresponding to the length of a brick, said first horizontal line of support pins being parallel to said second horizontal line of support pins, said first horizontal line being spaced from said second horizontal line by more than the height of a brick, the support pins in said first horizontal line being offset from the support pins in said second horizontal line;
   c) first means for attaching said planar sheet to a fixed surface; and
   d) second means for attaching said planar sheet to the bricks being layed.

2. A template in accordance with claim 1, further including a plurality of spacing elements projecting from said sheet in a predetermined pattern, said spacing elements being disposed between said support pins.

3. A template in accordance with claim 2, wherein said planar sheet, said plurality of support pins, and said plurality of spacing elements are all formed of plastic and are all molded as an integral unit.

4. A template in accordance with claim 2, wherein said spacing elements each have a width equal to the space between adjacent bricks.

5. A template in accordance with claim 2, wherein said spacing elements each have a width of ½" or ¼" and a depth of 3½ inches.

6. A template in accordance with claim 1, wherein said planar sheet is made of durable plastic, metal or wood.

7. A template in accordance with claim 1, wherein said planar sheet is water impermeable.

8. A template in accordance with claim 1, wherein said planar sheet is an insulation barrier.

9. A template in accordance with claim 1, further including one or more leveling devices within said planar sheet for leveling said planar sheet relative to a fixed surface.

10. A template in accordance with claim 1, wherein said first means for attaching said planar sheet includes a first plurality of holes for receiving nails, screws or rivets.

11. A template in accordance with claim 10, wherein the holes in said first plurality of holes are 16" apart so as to be aligned with the vertical studs in a building structure.

12. A template in accordance with claim 1, wherein said second means for attaching said planar sheet includes a second plurality of holes for receiving wall ties.

13. A template in accordance with claim 1, wherein said second means for attaching said planar sheet to the bricks being layed includes a second plurality of holes for receiving an L-shaped metal or plastic wall tie for preventing said bricks being layed from falling forward and away from said planar sheet.

14. A template in accordance with claim 1, wherein said planar sheet is used in place of the outer sheathing on a building structure.

15. A template in accordance with claim 1, wherein said plurality of support pins are used to support a plurality of partial bricks on said sheet.

16. A template in accordance with claim 1, wherein said plurality of support pins are used to support a plurality of overlapping bricks on said sheet.

17. A template in accordance with claim 1, wherein said plurality of support pins are formed of plastic, metal or wood.

18. A template in accordance with claim 1, wherein said planar sheet is rigid and has a square or rectangular shape.

19. A template in accordance with claim 1, wherein said plurality of support pins include a plurality of pairs of support pins, the support pins in said pairs of support pins being spaced apart less than the length of a brick to define a support distance, so that each of said pairs of support pins may support one brick thereon.

20. A template in accordance with claim 19, wherein said support distance is between 2 inches to 10 inches.

21. A template in accordance with claim 1, wherein the support pins in said first horizontal line are offset from the support pins in said second horizontal line by a length equal to the length of half a brick.

22. A template in accordance with claim 1, wherein said planar sheet has a height in the range of 32 inches to 44 inches; a length in the range of 48 inches to 60 inches; and a thickness in the range of ¼ inch to 4 inches.

23. A template in accordance with claim 1, wherein said plurality of support pins each have a diameter in the range of ⅛ of an inch to ¼ inch with a preferred diameter of ⅛ of an inch; and a depth in the range of 2¾ inches to 3¾ inches with a preferred length of 3½ inches.

24. A method for laying a plurality of bricks on a template comprising the steps of:
 a) arranging a plurality of sheets with respect to each other, said sheets having the structure of claim 1;
 b) leveling said plurality of sheets with respect to each other in horizontal and vertical directions;
 c) attaching said plurality of sheets to a fixed surface such that the support pins on each sheet are parallel to the support pins on the remaining of said plurality of sheets;
 d) placing each brick on a pair of adjacent support pins to form a predetermined brick pattern; and
 e) applying mortar between said bricks to adhere them to each other to form a predetermined brick pattern wall.

25. A template for laying a plurality of cinder blocks, comprising:
 a) a substantially planar sheet having a plurality of support pins projecting therefrom at a 90° angle for supporting a plurality of cinder blocks;
 b) said plurality of support pins being arranged in a predetermined pattern, said pattern including a first plurality of said support pins disposed along a first horizontal line at predetermined spaces corresponding to the length of a cinder block, a second plurality of said support pins disposed along a second horizontal line at predetermined spaces corresponding to the length of a cinder block, said first horizontal line of support pins being parallel to said second horizontal line of support pins, said first horizontal line being spaced from said second horizontal line by more than the height of a cinder block, the support pins in said first horizontal line being offset from the support pins in said second horizontal line;
 c) first means for attaching said planar sheet to a fixed surface; and
 d) second means for attaching said planar sheet to the cinder blocks being layed.

26. A template in accordance with claim 25, wherein said plurality of support pins each have a diameter in the range of ¼ of an inch to ⅜ inch with a preferred diameter of ¼ of an inch; and a depth in the range of 3½ inches to 7½ inches with a preferred length of 7½ inches.

27. A template for laying a plurality of bricks, comprising:
 a) a substantially planar first strip having a plurality of support pins projecting therefrom at a 90° angle for supporting a plurality of bricks;
 b) a substantially planar second strip having a plurality of support pins projecting therefrom at a 90° angle for supporting a plurality of bricks;
 c) said first strip including a first plurality of said support pins disposed along a first horizontal line at predetermined spaces corresponding to the length of a brick, said second strip including a second plurality of said support pins disposed along a second horizontal line at predetermined spaces corresponding to the length of a brick;
 d) said first and second strips being arranged adjacent to each other to form a template so that said first horizontal line of support pins is parallel to said second horizontal line of support pins and said first horizontal line is spaced from said second horizontal line by more than the height of a brick;
 e) first means for attaching said first and second strips to a fixed surface; and
 f) second means for attaching said first and second strips to the bricks being layed.

28. A template in accordance with claim 27, wherein said second strip is turned 180° in relationship to said first strip, such that the support pins in said first horizontal line of said first strip are offset from the support pins in said second horizontal line of said second strip.

29. A template in accordance with claim 27, further including a plurality of spacing elements projecting from said sheet in a predetermined pattern, said spacing elements being disposed between said support pins.

30. A template in accordance with claim 29, wherein said first and second strips, said plurality of support pins, and said plurality of spacing elements are all formed of plastic and are all molded as an integral unit.

31. A template in accordance with claim 29, wherein said spacing elements each have a width equal to the space between adjacent bricks.

32. A template in accordance with claim 29, wherein said spacing elements each have a width of ½₁" or ¼" and a depth of 3½ inches.

33. A template in accordance with claim 27, wherein said planar strips are made of flexible or rigid plastic, metal or wood.

34. A template in accordance with claim 27, further including one or more leveling devices within said first strip for leveling said first strip relative to a fixed surface.

35. A template in accordance with claim 27, wherein said first means for attaching said first and second strips includes a first plurality of holes for receiving nails, screws or rivets.

36. A template in accordance with claim 35, wherein the holes in said first plurality of holes are 16" apart so as to be aligned with the vertical studs in a building structure.

37. A template in accordance with claim 27, wherein said second means for attaching said first and second strips includes a second plurality of holes for receiving wall ties.

38. A template in accordance with claim 27, wherein said second means for attaching said first and second strips to the bricks being layed includes a second plurality of holes for receiving an L-shaped metal or plastic wall tie for preventing said bricks being layed from falling forward and away from said planar sheet.

39. A template in accordance with claim 27, wherein said plurality of support pins are used to support a plurality of partial bricks on said sheet.

40. A template in accordance with claim 27, wherein said plurality of support pins are used to support a plurality of overlapping bricks on said sheet.

41. A template in accordance with claim 27, wherein said plurality of support pins are formed of plastic, metal or wood.

42. A template in accordance with claim 27, wherein said planar strip has a rectangular shape.

43. A template in accordance with claim 27, wherein said plurality of support pins includes a plurality of pairs of support pins, the support pins in said pairs of support pins being spaced apart less than the length of a brick to define a support distance, so that each of said pairs of support pins may support one brick thereon.

44. A template in accordance with claim 43, wherein said support distance is between 2 inches to 10 inches.

45. A template in accordance with claim 27, wherein the support pins in said first horizontal line of said first strip are offset from the support pins in said second horizontal line of said second strip by a length equal to the length of half a brick.

46. A template in accordance with claim 27, wherein said first and second strips each have a height in the range of 1 inch to 2 inches; a length in the range of 48 inches to 60 inches; and a thickness in the range of ¼ inch to ½ inches.

47. A template in accordance with claim 27, wherein said plurality of support pins each have a diameter in the range of ⅛ of an inch to ¼ inch with a preferred diameter of ⅛ of an inch; and a depth in the range of 2¾ inches to 3¾ inches with a preferred length of 3½ inches.

48. A method for laying a plurality of bricks on a template, comprising the steps of:
a) arranging a plurality of strips with respect to each other, each of said strips having the structure of claim 27;
b) leveling said plurality of strips with respect to each other;
c) attaching said plurality of strips to a fixed surface such that the support pins on each strip are parallel to the support pins on the remaining of said plurality of strips;
d) placing each brick on a pair of adjacent support pins to form a predetermined brick pattern; and
e) applying mortar between said bricks to adhere them to each other to form a predetermined brick pattern wall.

49. A template for laying a plurality of bricks, comprising:
a) a substantially planar sheet having a plurality of support pins projecting therefrom at a 90° angle for supporting a plurality of bricks;
b) said plurality of support pins being arranged in a predetermined pattern, said pattern including a first plurality of said support pins disposed along a first horizontal line at predetermined spaces corresponding to the length of a brick, a second plurality of said support pins disposed along a second horizontal line at predetermined spaces corresponding to the length of a brick, said first horizontal line of support pins being parallel to said second horizontal line of support pins, said first horizontal line being spaced from said second horizontal line by more than the height of a brick;
c) first means for attaching said planar sheet to a fixed surface; and
d) second means for attaching said planar sheet to the bricks being layed.

50. A template in accordance with claim 49, further including a plurality of spacing elements projecting from said sheet in a predetermined pattern, said spacing elements being disposed between said support pins.

51. A template in accordance with claim 49, wherein said planar sheet is made of plastic, metal or wood.

52. A template in accordance with claim 49, wherein said planar sheet is water impermeable.

53. A template in accordance with claim 49, wherein said planar sheet is an insulation barrier.

54. A template in accordance with claim 49, further including one or more leveling devices within said planar sheet for leveling said sheet relative to a fixed surface.

55. A template in accordance with claim 49, wherein said first means for attaching said planar sheet includes a first plurality of holes for receiving nails, screws or rivets.

56. A template in accordance with claim 49, wherein said second means for attaching said planar sheet includes a second plurality of holes for receiving wall ties.

57. A template in accordance with claim 49, wherein said second means for attaching said planar sheet to the bricks being layed includes a second plurality of holes for receiving an L-shaped metal or plastic wall tie for preventing said bricks being layed from falling forward and away from said planar sheet.

58. A template in accordance with claim 49, wherein said planar sheet is used in place of the outer sheathing on a building structure.

59. A template in accordance with claim 49, wherein said plurality of support pins are used to support a plurality of partial bricks on said sheet.

60. A template in accordance with claim 49, wherein said plurality of support pins are used to support a plurality of overlapping bricks on said sheet.

61. A template in accordance with claim 49, wherein said plurality of support pins are formed of plastic, metal or wood.

62. A template in accordance with claim 49, wherein said planar sheet, said plurality of support pins, and said plurality of spacing elements are all formed of plastic and are all molded as an integral unit.

63. A template in accordance with claim 49, wherein said planar sheet has a square or rectangular shape.

64. A template in accordance with claim 49, wherein said plurality of support pins includes a plurality of pairs of support pins, the support pins in said pairs of support pins being spaced apart less than the length of a brick to define a support distance, so that each of said pairs of support pins may support one brick thereon.

65. A template in accordance with claim 64, wherein said support distance is between 2 inches to 10 inches.

66. A template in accordance with claim 49, wherein said spacing elements each have a width equal to the space between adjacent bricks.

67. A template in accordance with claim 49, wherein said spacing elements each have a width of ½" or ¼" and a depth of 3½ inches.

68. A template in accordance with claim 49, wherein the holes in said first plurality of holes are 16" apart so as to be aligned with the vertical studs in a building structure.

69. A template in accordance with claim 49, wherein said planar sheet has a height in the range of 32 inches to 44 inches; a length in the range of 48 inches to 60 inches; and a thickness in the range of ¼ inch to 4 inches.

70. A template in accordance with claim 49, wherein said plurality of support pins each have a diameter in the range of ⅛ of an inch to ¼ inch with a preferred diameter of ⅛ of an inch; and a depth in the range of 2¾ inches to 3¾ inches with a preferred length of 3½ inches.

* * * * *